United States Patent [19]

Schorr et al.

[11] Patent Number: 4,853,949
[45] Date of Patent: Aug. 1, 1989

[54] FAIL SAFE VOICE SYSTEM FOR INTEGRATED SERVICES FOR DIGITAL NETWORK SUBSCRIBERS

[75] Inventors: Ian A. Schorr, Chicago; Gregory P. Pucci, Batavia; John P. Dorth, Downers Grove; Bruce R. Miller, Aurora, all of Ill.

[73] Assignee: Rockwell International Corporation, El Segundo, Calif.

[21] Appl. No.: 173,228

[22] Filed: Mar. 24, 1988

[51] Int. Cl.⁴ .................................... H04M 11/06
[52] U.S. Cl. .................................... 379/2; 379/94
[58] Field of Search ............ 379/93, 94, 32, 26, 379/2, 198, 273, 165; 370/16, 84

[56] References Cited

U.S. PATENT DOCUMENTS 4,381,427  4/1983  Cheal ............................... 379/93
4,392,024  7/1983  Shinoi ............................. 379/165
4,740,963  4/1988  Eckley ............................. 370/84

Primary Examiner—Jin F. Ng
Assistant Examiner—Bonita Lewis
Attorney, Agent, or Firm—C. B. Patti; V. L. Sewell; H. F. Hamann

[57] ABSTRACT

A fail safe voice system and method for digital telephone networks. The system provides for operation of voice telephone equipment at a customer location when a fault occurs at the customer location. The system has a central office with an analog line termination/digital transceiver connected to subscriber loop lines. The customer location has a digital transceiver/analog station set interface connected to the subscriber loop lines and to the voice telephone equipment. In response to a fault at the customer location the voice telephone equipment is connected directly to the subscriber loop lines thereby eliminating the digital transceiver/analog station set interface.

16 Claims, 5 Drawing Sheets

POWER FAILURE OPERATION CONCEPT

POWER FAILURE OPERATION CONCEPT

FAIL SAFE VOICE SYSTEM FOR INTEGRATED SERVICES FOR DIGITAL NETWORK SUBSCRIBERS

BACKGROUND OF THE INVENTION

This invention relates generally to integrated services digital networks (ISDN) and, in particular, to ensuring a voice telephone service at a customer's location when a power failure occurs at the customer's location.

Recently there has been a strong trend toward development of an integrated services digital network, which will either replace or coexist with traditional telephone service.

ISDN signal in a customer loop is sent over the same pair of wires which has been used in the past for plain old telephone service (POTS). ISDN, however, utilizes a coded digital signal with higher information density in both directions of transmission and, by doing so, increases the channel capacity. In particular, a single ISDN channel provides two voice frequency (VF) channel service plus a 16 kb/s data service (2B+D).

A 64 kb/s digital Pulse Code Modulated (PCM) signal is required for each VF channel; consequently, two VF channels plus 16 kb/s data channel requires 144 kb/s digital signal. ISDN can be used to provide multiple data channels instead of any VF channel, as long as the total bit rate doesn't exceed 144 kb/s. A detailed description of the ISDN can be found in literature, e.g., Anthony M. Rutkowski's "Integrated Services Digital Networks," 1985, Artech House, Inc.

Complex coding/decoding equipment serving two telephone and data channels requires much more power than a regular single telephone, therefore, at the customer premises local power is required for the ISDN equipment. Consequently, local power failures will not only eliminate the subscriber's data service, but will also eliminate regular voice service.

A typical ISDN service consists of three channels, referred to as two B channels plus a D channel. The two B channels are intended either for VF service or data up to 64 kilobits per second each. The D channel is a 16 kb/s data channel. The D channel could also be used for a low speed data transfer, such as remote meter reading at the customer's location or similar services. Typically, for a single pair of wires at a customer location, the ISDN type service would provide two voice lines, plus data services, such as data transfer of telemetry, e.g., meter reading. Alternatively, the customer could have one voice line, one high-speed data line and one medium-speed data line. Since this system requires intelligence consuming substantial power at both ends, it also requires local power at both ends of the link to operate the equipment.

It is well known that at times of local power failures people know that their phone will still operate and that they can use the telephone to make emergency calls when necessary. In an ISDN system, this will not be the case because once local power is lost, both of the B lines, as well as the D line, are inoperative.

In order to overcome this problem in similar applications in the prior art, one solution has been to provide a battery to power the local equipment so that at least the customer would be able to use the voice line even though the data lines may be inaccessible. Another approach in the prior art is to provide redundant facilitates in a sense that another pair of wires is connected to the customer location to provide the plain voice telephone service. Both such solutions are very costly and complex.

The present invention overcomes this problem in the prior art by utilizing an ISDN system while continuing to supply voice service to the customer location in the event of a power failure. The present invention accomplishes this without the use of redundant facilitates and without the use of batteries or portable generators to run local equipment. Furthermore, the present invention provides that the voice link remains present even when the failure is within the digital terminal equipment at the customer's location, as opposed to a power failure.

SUMMARY OF THE INVENTION

The present invention relates to a fail safe voice system for integrated services digital telephone networks used in subscriber loops and for providing for operation of voice telephone equipment at a customer location when a fault occurs at the customer location. The system at a central office has a central office switch having at least one set of tip and ring lines. An analog line termination/digital transceiver is connected to the tip and ring lines and has at least first and second subscriber loop terminals. A digital transceiver/analog station set interface has at least first and second subscriber loop terminals and at least one set of tip and ring lines connected to the voice telephone equipment. At least first and second subscriber loop lines are connected between the first and second subscriber loop terminals of the analog line termination/digital transceiver and the digital transceiver/analog station set interface, respectively.

At the central office first means for switching for connecting a loop current detector circuit in place of the analog line termination/digital transceiver is provided. The loop current detector circuit produces a loop current signal. A ring detector circuit is connected across the tip and ring lines of the analog line termination/digital transceiver. The ring detector circuit produces a ring detect signal. A scan circuit is connected across the first and second subscriber loop terminals of the analog line termination/digital transceiver. The scan circuit produces a DC path detect signal. The analog line termination/digital transceiver produces a sync loss signal. A control logic circuit receives the sync loss signal, the ring detect signal, the loop current signal and the DC path detect signal. The control logic circuit is connected to the first means for switching and controls the first means for switching in response to the sync loss signal, the ring detect signal, the loop current signal and the DC path detect signal.

A second means for switching is connected to first and second bypass lines between the first and second subscriber loop terminals of the digital transceiver/analog station set interface and the tip and ring lines connected to the voice telephone equipment. The second means for switching is activated and deactivated in response to an occurrence of the fault at the customer's location. The present invention also includes a method for providing the continuous voice telephone connection when a fault occurs at the customer's location.

BRIEF DESCRIPTION OF THE DRAWINGS

The features of the present invention which are believed to be novel, are set forth with particularity in the appended claims. The invention, together with further objects and advantages, may best be understood by reference to the following description taken in conjunction with the accompanying drawings, in the several Figures in which like reference numerals identify like elements, and in which:

DESCRIPTION OF THE PREFERRED EMBODIMENT

Figure 1:
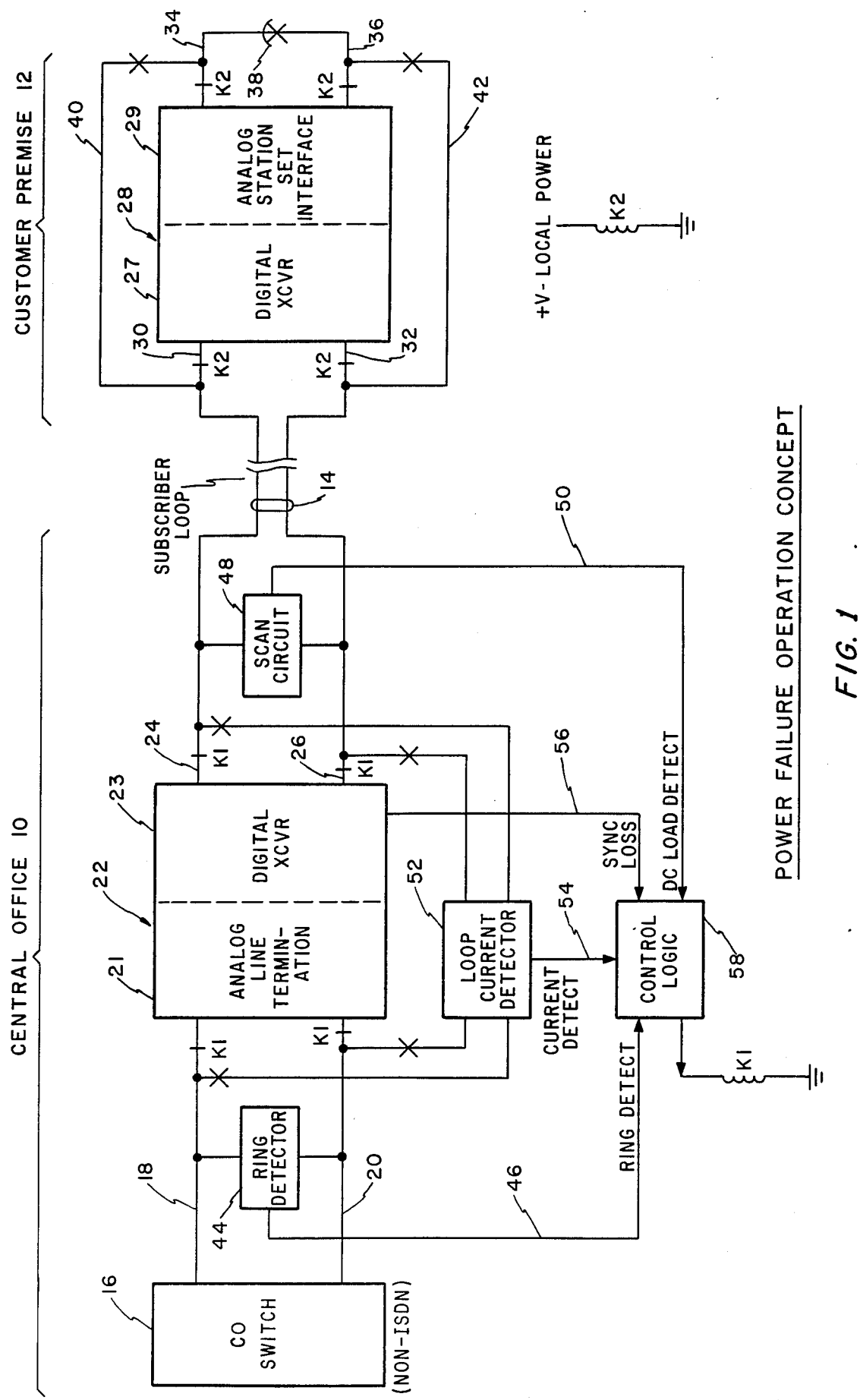
FIG. 1 is a general block diagram of the fail safe voice system for digital telephone networks.

The present invention has general applicability but is most advantageously utilized in an ISDN system as depicted in FIG. 1.

As shown in FIG. 1, a central office 10 is connected to the customer premises 12 by subscriber loop lines 14. The central office 10 has a standard central office switch 16 with tip and ring lines 18 and 20 connected to an analog side 21 of an analog line termination/digital transceiver 22. The central office switch 16 may be, for example, an AT&T 5ESS or a Northern Telecom DMS-100. The digital transceiver 23 has first and second subscriber loop terminals 24 and 26 which connect to the subscriber loop lines 14.

The customer premise 12 has a digital transceiver-/analog station set interface 28 which has subscriber loop terminals 30 and 32 on a digital transceiver side 27 which connect to the subscriber loop lines 14. The digital transceiver/analog station set interface 28 has tip and ring lines 34 and 36 connected to the analog side 29 which in turn are connected to the customer's voice telephone equipment 38. In addition, the customer premises 12 has first and second bypass lines 40 and 42 connecting the tip and ring lines 34 and 36 to the subscriber loop terminals 30 and 32, respectively. The analog line termination 21 and the analog interface 29 may be, for example, Rockwell 3657-01 Foreign Exchange Office (FXO) and 3657-00 Foreign Exhange Station (FXS) channel units, respectively.

As shown in FIG. 1, a relay K2 is provided which in a first position connects the subscriber loop lines 14 to the subscriber loop terminals 30 and 32 and connects the tip and ring lines 34 and 36 to the analog side 29. In a second position, the relay K2 will disconnect the subscriber loop terminals 30 and 32 from the subscriber loop lines 14 and will connect the bypass lines 40 and 42 to the tip and ring lines 34 and 36, respectively. As appropriate and in general the relay K2 either connects the bypass lines 40 and 42 or connects the digital transceiver/analog station set interface 28 in circuit. The relay K2 can be one relay with four sets of appropriate contacts or can be four separate relays each being controlled simultaneously. It is important to note that under normal conditions when the digital transceiver/analog station set interface 28 is connected in circuit the relay is held in its first position by applying local power to the relay K2. Thus, when there is a local power failure, the relay K2 releases thereby disconnecting the digital transceiver/analog station set interface 28 from the circuit and connecting in its place the bypass lines 40 and 42. Additionally, the customer can be supplied with a switch in which he can manually cause the relay K2 to change from the first position to the second position by denying power to a relay. An application for such would be if the digital transceiver/analog station set interface 28 itself should fail and thus the customer has the ability to switch over the bypass lines 40 and 42 for continued voice telephone service.

The central office 10 has a ring detector 44 connected between the tip and ring lines 18 and 20. The ring detector 44 outputs a ring detect signal on line 46 when the central office switch 16 applies a voltage to the tip and ring lines 18 and 20. Also, a scan circuit 48 is connected across the subscriber loop terminals 24 and 26 of the digital transceiver 23 and outputs a DC load detect signal on line 50. The DC load detect signal is representative of whether or not a DC load is present on the subscriber loop terminals 24 and 26.

A loop current detector 52 is also provided and is connected across the tip and ring terminals 18 and 20 and the loop subscriber terminals 24 and 26. The loop current detector 52 outputs a loop current signal on line 54 which in indicative of a loop current flowing in the central office circuit. The digital transceiver 23 also puts out a sync loss signal on line 56 indicative of a loss of synchronization between the digital transceiver 23 in the central office 10 and the digital transceiver 27 at the customer premises 12. These signals, the ring detect signal, the loop current signal, the sync loss signal and the scan detect signal are received by the control logic 58. The control logic 58 in response to these signals operates relay K1 which has four sets of contacts and, similar to the relay K2 at the customer's premises 12, operates to remove the analog line termination/digital transceiver 22 from the circuit. That is, in a first position relay K1 connects the tip and ring lines 18 and 20 to the analog side 21 and also connects the subscriber terminals 24 and 26 of the digital transceiver 23 to the subscriber loop lines 14. In a second position, the relay K1 disconnects the analog line termination/digital transceiver 22 and connects in the circuit the loop current detector 52 as shown in FIG. 1. Again, the relay K1 can in an alternative be actually four relays which are controlled simultaneously.

Under normal conditions, the digital transceivers 23 and 27 are in an idle condition, that is basic signaling and housekeeping information can be sent back and forth but there is presently no voice link or data link established. There is a minimal amount of circuitry that is operating to provide the signaling information back and forth. When the customer goes off hook, and analog station set interface 29 detects the fact that the telephone equipment 38 is off hook and sends a digital bit to its digital transceiver 27. The transceiver 27 then sends the signaling bit to the transceiver 23 at the central office 10 which then recognizes that the customer is requesting service. The two transceivers 23 and 27 are then powered up and a full transmission path is established and all standard signaling and voice information can be provided between the central office 10 and the customer premises 12. A DC blocking is provided in this mode by digital transceivers 23 and 27; consequently, no DC path is detected by a scan detector in central office 10.

When a power failure occurs at the customer's premises 12 during the process of a telephone call, the relay K2 at the customer premises 12 changes from its first position to its second position connecting bypass lines 40 and 42 and disconnecting the digital transceiver-/analog station set interface 28. Thus, there is no longer an coding/decoding conversion or DC blocking taking place at the customer premises 12. When this happens, the transceiver 23 at the central office 10 loses synchronization with the customer premises 12. As is known in the art, the clocking and timing signals that occur under normal operation can detect this situation that is, the fact that the link between the central office 10 and the customer premises 12 is no longer intact. The transceiver 23 then sends a sync loss signal along line 56. In this situation, the control logic 58 will then cause the relay K1 to operate thus removing the analog line termination/digital transceiver 22 from the circuit and replacing it with the loop current detector 52. The result is that the central office switch 16 is now connected to the customer's telephone voice device 38 along standard analog tip and ring lines as is well known in the art. A number of other scenarios, such as a return of power while the customer is still off hook, will be explained below. These other scenarios require the ring detect signal, the loop current signal, and the DC load detect signal which are utilized by the control logic 58.

Figure 2:
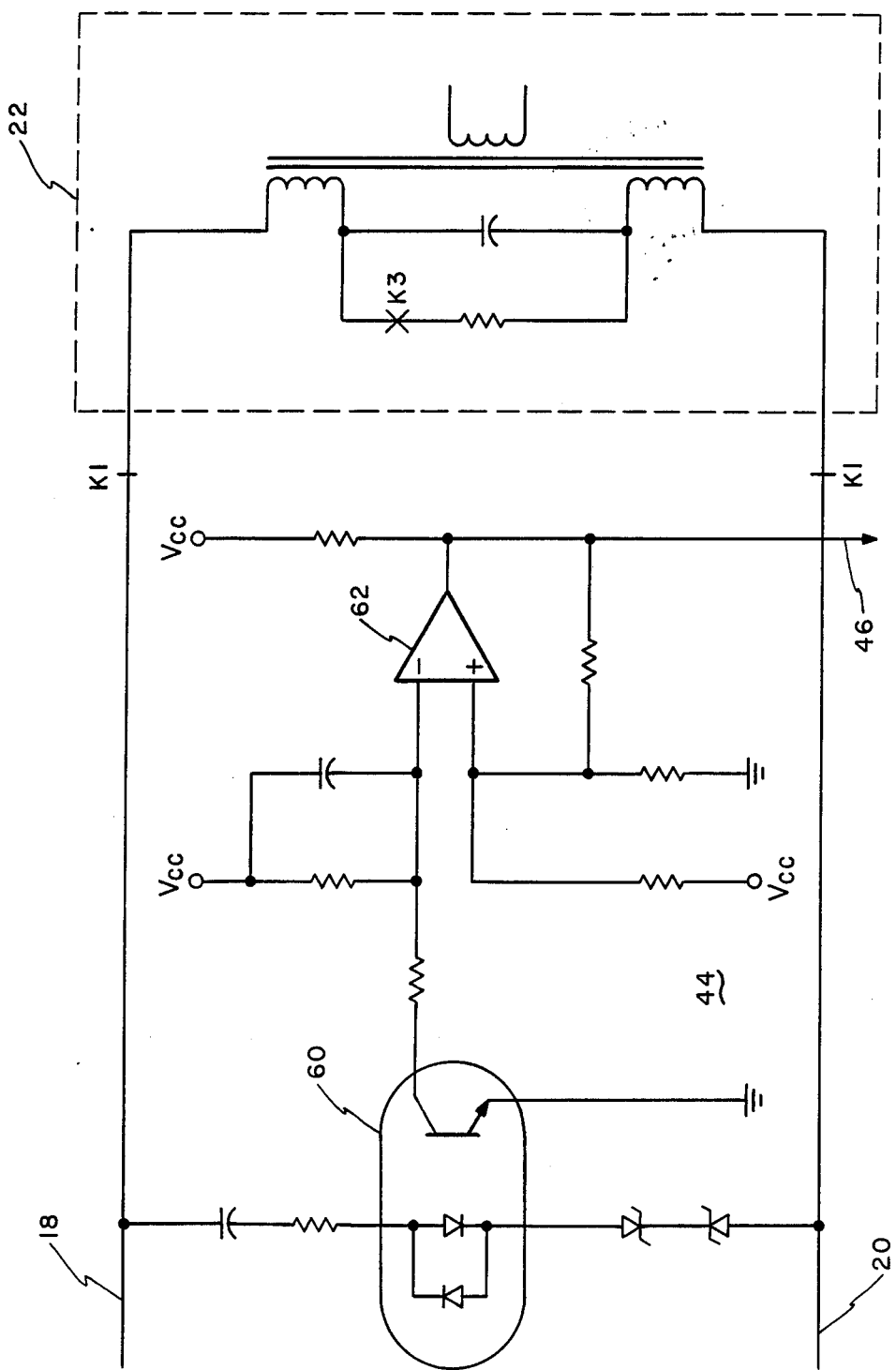
FIG. 2 is a circuit diagram of a ring detector used in the FIG. 1 system.

Referring now to FIG. 2, the ring detector 44 has an optical isolator 60, such as a 1N 4759A connected across the tip and ring lines 18 and 20. The optical isolator 60 outputs a signal to a comparator 62 on its negative input whenever a ring voltage is present across the tip and ring lines 18 and 20. The positive input of the comparator 62 receives a reference voltage. When the signal received on the negative input exceeds the reference voltage on the positive input the ring detector 44 outputs the ring detect signal on line 46. Such circuit is a typical representation of many circuits known in the prior art.

Figure 3:
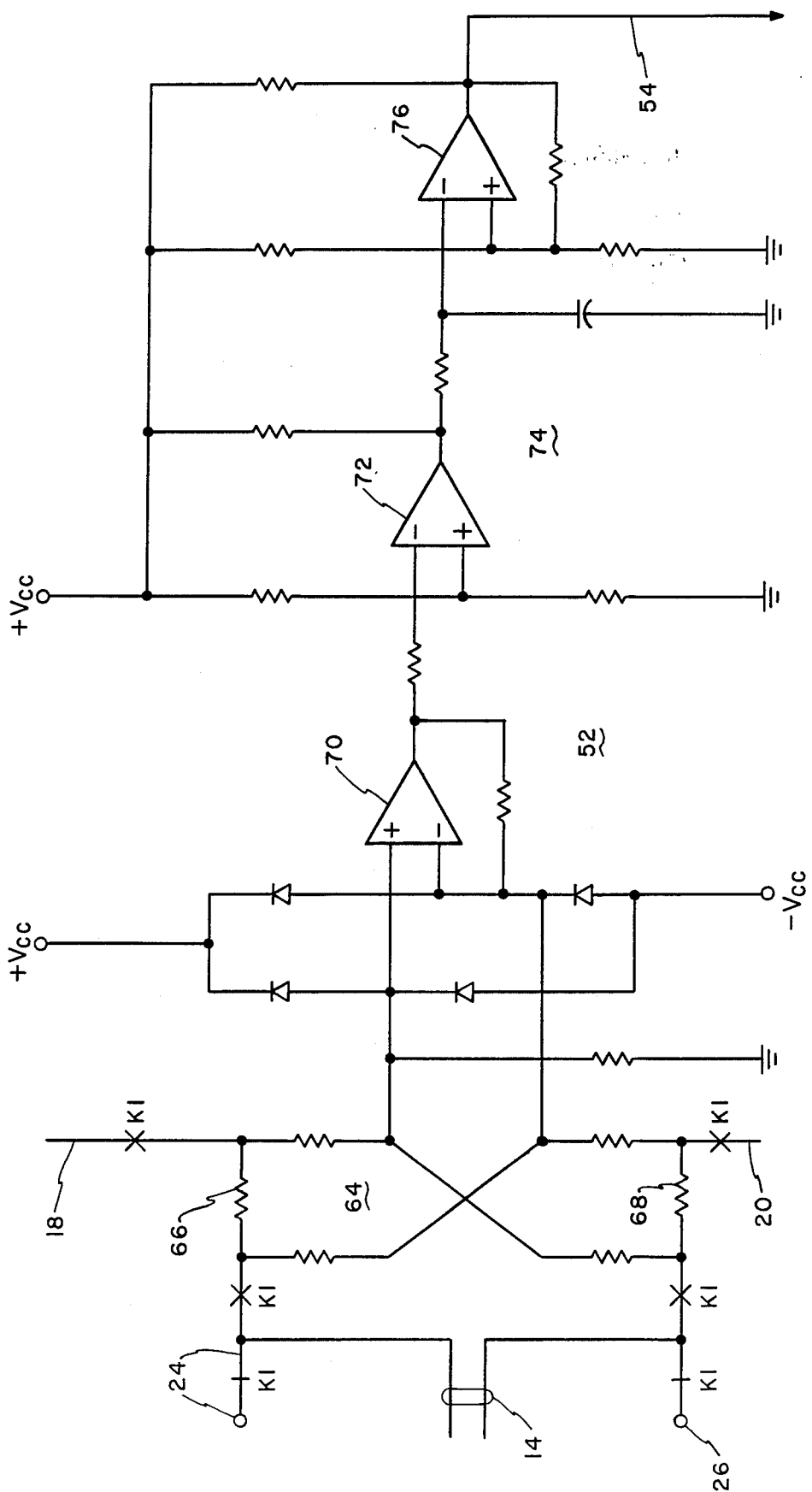
FIG. 3 is a circuit diagram of a loop current detector used in the FIG. 1 system.

As shown in FIG. 3, the loop current detector 52 has a resistive network 64 which places a sense resistor 66 in the tip line 18 and a sense resistor 68 in the ring line 20. The voltage across the sense resistors 66 and 68 is applied to the positive and negative terminals, respectively, of comparator 70. The comparator 70 operates as an operational amplifier and senses a current in the tip and ring leads 18 and 20. It produces an output voltage which is proportional to the current that is flowing in the tip and ring lines 18 and 20. This output voltage is then compared to a reference voltage by comparator 72, the output of which is filtered at filter 74 and amplified in amplifier 76. The output of amplifier 76 then is the loop current signal which appears on line 54. The fact that loop current in the lines 18 and 20 is present indicates that a connection has been made between the central office 10 and the customer premises 12. This circuit is also a typical representation of circuits known in the prior art.

Figure 4:
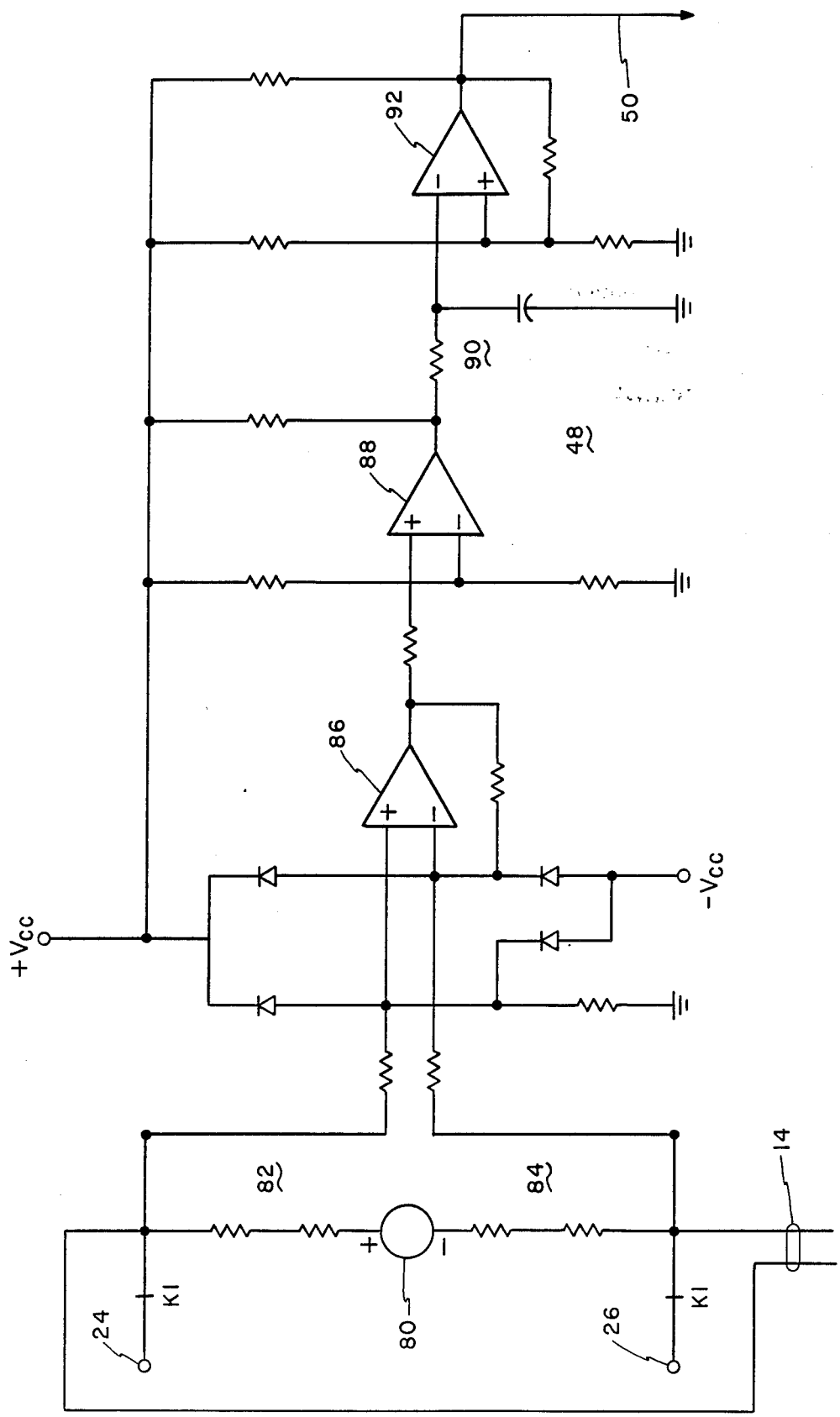
FIG. 4 is a circuit diagram of the scan circuit used in the FIG. 1 system.

As shown in FIG. 4, the scan circuit 48 is similar to the loop current detector 52. The scan circuit 48 directly senses if there is a terminating resistance across the subscriber loop 14 and ring lines 18 and 20. A voltage source 80 is connected through resistive networks 82 and 84 to the tip and ring lines An operational amplifier 86 has its positive and negative inputs connected to the tip and ring lines 24 and 26 and senses whether a voltage drop is sufficient between the tip and ring line 24 and 26 such that there is a load provided across the tip and ring lines 24 and 26. The operational amplifier 88 receives the output of comparator 86 and compares the output voltage level of 86 to a reference voltage. A filter stage 90 is provided at the output of comparator 88 and the signal is thereafter amplified in amplifier 92.

The output of amplifier 92 is the DC path detect signal on line 50.

Figure 5:
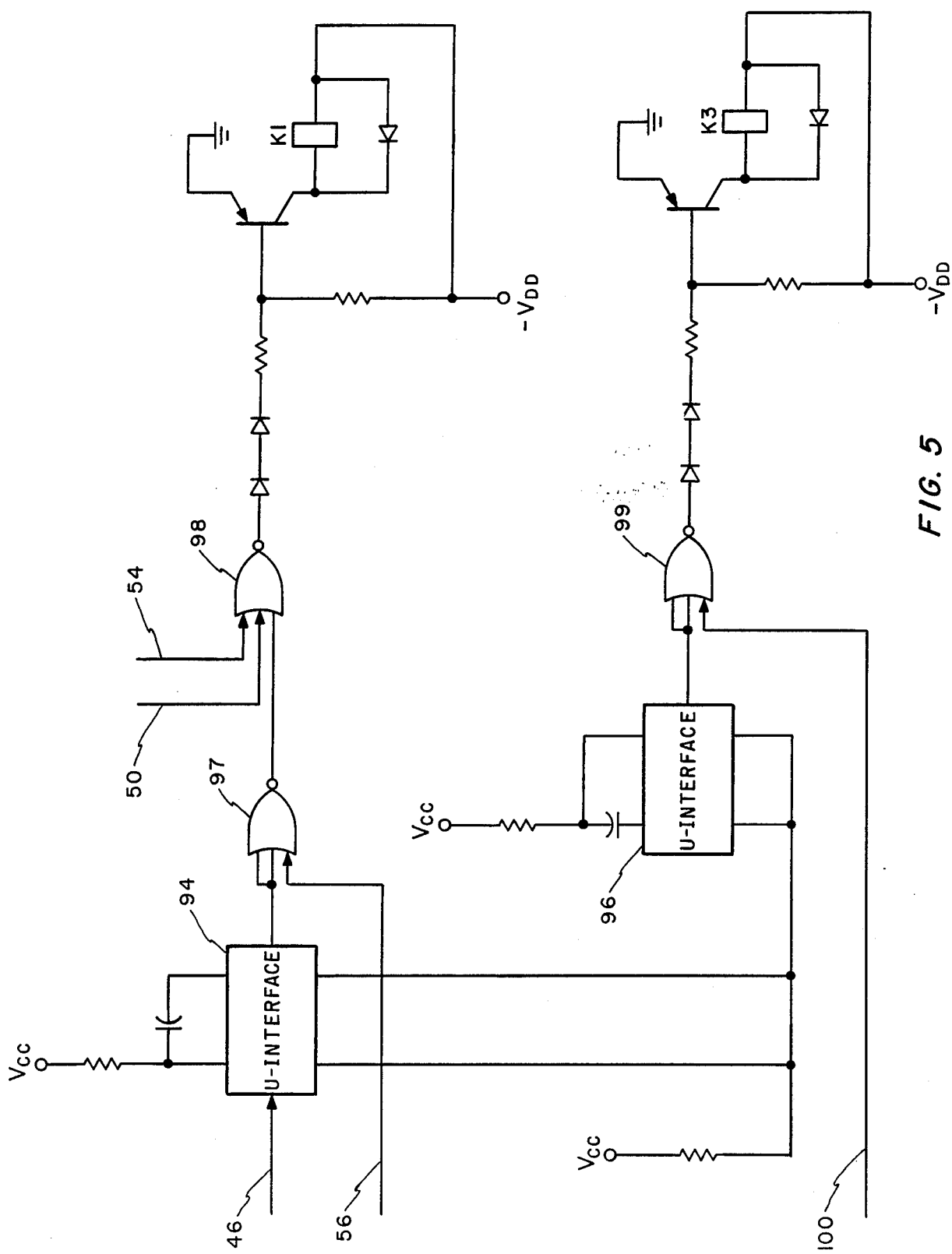
FIG. 5 is a circuit diagram of the control logic used in the FIG. 1 system.

As shown in FIG. 5 the control logic receives the DC path detect signal, the loop current signal, the sync loss signal and the ring detect signal on input lines 50, 54, 56 and 46, respectively. A standard integrated U-interface chip set 94 and 96 can be utilized, the chip 94 connected to the ring detect line 46. Logic gate 97 has inputs connected to an output of chip 94 and to the sync loss line 56. Logic gate 98 has inputs connected to the output of gate 97, DC path detect line 50 and loop current detect line 54. Logic gate 99 has inputs connected to an output of chip 96 and to a hook status line 100. The output of gate 98 controls relay K1 and the output of gate 99 controls a relay K3.

The following sets forth ten scenarios possible for the circuit shown in FIG. 1, that is the operation of the central office 10 (COT) and the customer premises 12 (CPE):

I. Condition: ISDN mode; idle-to active
Actions:
   (1). CPE goes off-hook
   (2). CPE transceiver powers up, sends "wake-up" digital signal
   (3). COT activates transceiver
   (4). Sync established- call processes II. Condition: ISDN mode: active-to-idle
Actions:
   (1). CPE goes on hook
   (2). CPE transceiver powers down
   (3). COT detects loss of activity of DC current (scan)
   (4). COT powers down transceiver III. Condition: CPE power failure while active
Actions:
   (1). CPE loses power while off-hook
   (2). CPE K2 relay releases; tansceiver disconnected and bypassed
   (3). COT transceiver loss sync
   (4). COT detects DC path
   (5). COT activates K1 relay, establishing service
   (6). COT loop current detector monitors call status IV. Condition: CPE power failure while idle
Actions:
   (1). CPE loses power while on-hook
   (2). CPE K2 relay releases
   (3). COT scan circuit indicates no DC load due to on-hook condition
   (4). COT remains in ISDN mode (no K1 relay activation)

V. Condition: CPE goes off-hook during power failure
Actions:
   (1). CPE K2 relay already released
   (2). CPE goes off-hook
   (3). COT scan circuit detects DC current
   (4). COT activates K1 relay, establishing service
   (5) COT loop current detector monitors call status VI. Condition: CPE goes on-hook during power failure
Actions:
   (1). CPE K2 and COT K1 relays deactivated
   (2). CPE goes on-hook
   (3). COT scan circuit detects no loop current
   (4). COT activates K1 relay; scan circuit monitors CPE DC path status
   (5). K2 relay remains deactivated VII. Condition: CPE power restored while idle Actions:
 (1). CPE power restored
 (2). CPE K2 relay activates
 (3). COT remains in ISDN mode VIII. Condition: CPE power restored during voice call
Actions:
 (1). CPE K2 and COT K1 relays deactivated
 (2). CPE power restored
 (3). CPE K2 relay activates; loop current interrupted
 (4). COT detects loop current loss; scanner senses no DC current
 (5). COT K1 relay releases; FXO terminates CO line
 (6). COT transceiver sends digital "wake-up" signal to CPE
 (7). Re-sync occurs
 (8). Call continuous in ISDN mode IX. Condition: CO-to-CPE alerting: ISDN mode
Actions:
 (1). COT FXO detects ringing from CO
 (2). COT transceiver sends digital "wake-up" signal to CPE
 (3). CPE transceiver powers up, receives ring command
 (4). CPE rings phone X. Condition: CO-to-CPE alerting: power failure mode
Actions:
 (1). COT K1 relay activated and CPE K2 relay deactivated
 (2). COT FXO detects ringing from CO
 (3). COT transceiver sends digital "wake-up" signal to CPE
 (4). CPE transceiver does not respond
 (5). COT times out, deactivates K1 relay, rings phone The invention is not limited to the particular details of the apparatus depicted and other modifications and applications are contemplated. Certain other changes may be made in the above described apparatus without departing from the true spirit and scope of the invention herein involved. It is intended, therefore, that the subject matter in the above depiction shall be interpreted as illustrative and not in a limiting sense.

What is claimed is:

1. A fail safe voice system for digital telephone networks and for providing for operation of voice telephone equipment at a customer location when a fault occurs at the customer location, the system having a central office having means for coding/decoding connected to subscriber loop lines and at least one customer location having means for coding/decoding connected to the subscriber loop lines comprising:
   first means for connecting the voice telephone equipment to the subscriber loop lines and bypassing the customer's means for coding/decoding in response to a fault at the customer's premises; and
   second means for connecting a means for determining loop current to the subscriber loop lines and bypassing the central office's means for coding/decoding in response to a loss of synchronization of the central office's means for coding/decoding with the customer's location means for coding/decoding.

2. The system described in claim 1, wherein said second means for connecting has:
   a first means for switching for connecting said means for determining loop current to the subscriber loop lines and to tip and ring lines from a central office switch in the central office, said means for determining loop current producing a loop current signal;
   means for ring detecting connected across said tip and ring lines of the central office switch, said means for ring detecting producing a ring detect signal;
   means for detecting a DC load on the subscriber loop lines connected across said subscriber loop lines at said central office, said means for detecting a DC load producing a DC load detect signal; and
   means for controlling said first means for switching, said means for controlling receiving a sync loss signal from the means for coding/decoding in the central office in response to a loss of synchronization between the means for coding/decoding in the central office and the means for coding/decoding at the customer location, receiving said ring detect signal, receiving said loop current signal, and receiving said DC load detect signal, said means for controlling activates said means for switching in response to said sync loss signal, said ring detect signal, said loop current signal and said DC load detect signals.

3. The system described in claim 1, wherein said means for connecting the voice telephone device to the subscriber loop line has a second means for switching for connecting first and second bypass lines between the loop subscriber lines and tip and ring lines connected to said voice telephone equipment, said second means for switching being activated and deactivated in response to an occurrence of the fault at the customer's location.

4. The system described in claim 1, wherein said fault is a malfunction of the means for coding/decoding at the customer's location.

5. The system described in claim 1, wherein the fault is a loss of electrical power at the customer's location.

6. The system described in claim 1, wherein said second means for connecting has;
   a firsrt means for switching for connecting said means for determining loop current to the subscriber loop lines and to tip and ring lines from a central office switch in the central office, said means for determining current producing a loop current signal;
   means for ring detecting connected across said tip and ring lines of the central office switch, said means for ring detecting producing a ring detect signal;
   means for detecting a DC load on the subscriber loop lines connected across said subscriber loop lines at said central office, said means for detecting a DC load producing a DC load detect signal; and
   means for controlling said first means for switching, said means for controlling receiving at least a sync loss signal from the means for coding/decoding in the central office in response to a loss of synchronization between the means for coding/decoding at the customer location, said means for controlling activating said means for switching in response to at least said sync loss signal.

7. A fail safe voice system for digital telephone networks and for providing for operation of a voice telephone device at a customer location when a fault occurs at the customer location, comprising:

central office switch having at least one set of tip and ring lines;

analog line termination/digital transceiver having an analog side connected to said tip and ring lines and having at least first and second subscriber loop terminals connected to a digital side said analog line termination/digital transceiver producing a sync loss signal;

digital transceiver/analog station set interface having at least first and second subscriber loop terminals connected to a digital side and having connected to an analog side at least one set of tip and ring lines also connected to the voice telephone equipment;

at least first and second subscriber loop lines connected between said first and second subscriber loop terminals of said analog line termination/digital transceiver and said digital transceiver/analog station set interface, respectively;

first means for switching for connecting a loop current detector circuit in place of said analog line termination/digital transceiver, said loop current detector circuit producing a loop current signal;

ring detector circuit connected across said tip and ring lines of said analog line termination/digital transceiver, said ring detector circuit producing a ring detect signal;

scan circuit connected across said first and second subscriber loop terminals of said analog line termination/digital transceiver, said scan circuit producing a DC load detect signal;

control logic circuit receiving said sync loss signal, said ring detect signal, said loop current signal and said DC load detect signal, and connected to said first means for switching and controlling said first means for switching in response to said sync loss signal, said ring detect signal, said loop current signal and said DC load detect signal;

second means for switching for connecting first and second bypass lines between said first and second subscriber loop terminals, respectively, of said digital transceiver/analog station set interface and said tip and ring lines connected to said voice telephone equipment, thereby disconnecting said digital transceiver/analog station set interface, said second means for switching being activated and deactivated in response to an occurrence of the fault at the customer's location.

8. The system described in claim 7, wherein said fault is a malfunction of the digital transceiver/analog station set interface at the customer location.

9. The system described in claim 7, wherein said fault is a loss of electrical power at the customer location, said second means for switching being activated by said electrical power and being deactivated in the occurrence of a loss of the electrical power, deactivating said second means for switching causing said first and second bypass lines to be connected.

10. In a digital network system a method for providing for operation of a voice telephone equipment at a customer location when a fault occurs at the customer location, said method comprising the steps of:

automatically connecting the voice telephone equipment to subscriber loop lines and bypassing a customer location means for coding/decoding in response to a fault at the customer's location; and connecting a means for determining loop current to said subscriber loop lines and bypassing a central office means for coding/decoding in response to a loss of synchronization of the central office means for coding/decoding with the customer location means for coding/decoding, said central office connected to said customer location by said subscriber loop lines.

11. The method described in claim 10, wherein said fault is a malfunction of the means of coding/decoding at the customer's location.

12. The method described in claim 10, wherein the fault is a loss of electrical power at the customer's location.

13. The method described in claim 10, wherein said method further comprises the steps of:

when the voice telephone equipment goes on-hook after said ococurrence of a fault at the customer's location, sensing at the central office the on-hook and providing a DC load detect signal indicative thereof, detecting no loop current in said subscriber loop lines and providing a loop current signal indicative thereof, reconnecting said means for coding/decoding and disconnecting said means for determining loop current at the central office in response to said DC load detect signal and said loop current signal.

14. The method described in claim 10, wherein said method further comprises the steps of:

when said occurrence of a power failure is removed at the customer location and the voice telephone equipment is off-hook, automatically connecting the means for coding/decoding and disconnecting the voice telephone equipment from the subscriber loop lines at the customer location;

at least detecting a loss of loop current in the subscriber loop lines at the central office and providing a loop current signal indicative thereof; and reconnecting the means for coding/decoding and disconnecting the means for determining loop current at the central office in response to said loop current signal.

15. A fail safe voice system for digital telephone networks and for providing for operation of a voice telephone device at a customer location when a fault occurs at the customer location comprising:

central office switch having at least one set of tip and ring lines;

analog line termination/digital transceiver having an analog side connected to said tip and ring lines and having at least first and second subscriber loop terminals connected to a digital side, said analog line termination/digital transceiver producing a sync loss signal;

digital transceiver/analog station set interface having at least first and second subscriber loop terminals connected to a digital side and having connected to an analog side at least one set of tip and ring lines also connected to the voice telephone equipment;

at least first and second subscriber loop lines connected between said first and second subscriber loop terminals of said analog line termination/digital transceiver and said digital transceiver/analog station set interface, respectively;

a first relay having a plurality of contacts for connecting a loop current detector circuit in place of said analog line termination/digital transceiver, said loop current detector circuit producing a loop current signal;

scan circuit connected across said first and second subscriber loop terminals of said analog line termination/digital transceiver, said scan circuit producing a DC load detect signal;

control logic circuit receiving said sync loss signal, said ring detect signal, said loop current signal and said DC load detect signal, and connected to said first means relay and controlling said first relay in response to said sync loss signal, said ring detect signal, said loop current signal and said DC load detect signal;

a second relay having a plurality of contacts for connecting first and second bypass lines between said first and second subscriber loop terminals, respectively, of said digital transceiver/analog station set interface and said tip and ring lines connected to said voice telephone equipment, thereby disconnecting said digital transceiver/analog station set interface, said second relay being activated and deactivated in response to a loss of power at the customer's location.

16. The system described in claim 15, wherein when said second relay is energized by said power at the customer's location, a first set of contacts of said second relay connecting said tip and ring lines from the voice telephone equipment to the analog side of the digital transceiver/analog station set interface and disconnecting said bypass lines from said tip and ring lines, said second relay also having a second set of contacts connecting said subscriber loop lines to said subscriber loop terminals of said digital transceiver/analog station set interface and disconnecting said bypass lines from said subscriber loop terminals.

* * * * *